United States Patent
Choi et al.

(10) Patent No.: US 12,451,200 B2
(45) Date of Patent: Oct. 21, 2025

(54) MEMORY DEVICE RELATED TO VERIFYING MEMORY CELLS IN AN ERASE STATE AND METHOD OF OPERATING THE MEMORY DEVICE

(71) Applicant: SK hynix Inc., Icheon-si (KR)

(72) Inventors: Hyung Jin Choi, Icheon-si (KR); Chan Sik Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 134 days.

(21) Appl. No.: 18/191,807

(22) Filed: Mar. 28, 2023

(65) Prior Publication Data

US 2024/0153568 A1   May 9, 2024

(30) Foreign Application Priority Data

Nov. 8, 2022 (KR) .......................... 10-2022-0147871

(51) Int. Cl.
*G11C 16/34* (2006.01)
*G11C 16/10* (2006.01)
*G11C 16/12* (2006.01)

(52) U.S. Cl.
CPC ........ *G11C 16/3445* (2013.01); *G11C 16/102* (2013.01); *G11C 16/12* (2013.01)

(58) Field of Classification Search
CPC .... G11C 16/12; G11C 16/102; G11C 16/3445
USPC ................................................. 365/185.22
See application file for complete search history.

(56) References Cited

U.S. PATENT DOCUMENTS

| 2008/0137416 A1* | 6/2008 | Lee ......................... G11C 16/10 365/185.12 |
| 2008/0144387 A1* | 6/2008 | Kim ........................ G11C 16/16 365/185.33 |
| 2009/0290423 A1* | 11/2009 | Kim ...................... G11C 16/344 365/185.29 |
| 2010/0110796 A1* | 5/2010 | Park ........................ G11C 16/16 365/185.29 |
| 2010/0254193 A1* | 10/2010 | Park .................... G11C 16/3459 365/185.18 |
| 2012/0099375 A1* | 4/2012 | Choi ................... G11C 16/0483 365/185.11 |
| 2012/0254515 A1* | 10/2012 | Melik-Martirosian ...................... G06F 12/0246 711/E12.008 |
| 2013/0010547 A1* | 1/2013 | Aritome ................. G11C 16/10 365/189.07 |

(Continued)

FOREIGN PATENT DOCUMENTS

KR     1020140091839 A     7/2014
KR     1020220156399 A     11/2022

*Primary Examiner* — Sung Il Cho
(74) *Attorney, Agent, or Firm* — WILLIAM PARK AND ASSOCIATES LTD.

(57) ABSTRACT

Provided herein is a memory device and a method of operating the memory device. The memory device includes memory cells coupled to a word line, a peripheral circuit configured to perform a program operation of increasing threshold voltages of the memory cells to threshold voltages corresponding to a target program state among a plurality of program states, and a program operation controller configured to determine whether to perform an erase state verify operation of identifying threshold voltages of erase cells having an erase state as the target program state among the memory cells.

18 Claims, 8 Drawing Sheets

(56) References Cited

U.S. PATENT DOCUMENTS

| | | | |
|---|---|---|---|
| 2013/0163324 A1* | 6/2013 | Noh | G11C 16/0483 |
| | | | 365/185.02 |
| 2017/0178740 A1* | 6/2017 | Kim | G11C 16/3481 |
| 2020/0395077 A1* | 12/2020 | Lee | G11C 16/3459 |
| 2022/0101930 A1* | 3/2022 | Choi | G11C 16/32 |

* cited by examiner

MEMORY DEVICE RELATED TO VERIFYING MEMORY CELLS IN AN ERASE STATE AND METHOD OF OPERATING THE MEMORY DEVICE

CROSS-REFERENCE TO RELATED APPLICATION

The present application claims priority under 35 U.S.C. § 119(a) to Korean patent application number 10-2022-0147871 filed on Nov. 8, 2022, in the Korean Intellectual Property Office, the entire disclosure of which is incorporated by reference herein.

BACKGROUND

1. Technical Field

Various embodiments of the present disclosure relate to an electronic device, and more particularly to a memory device related to verifying memory cells in an erase state and a method of operating the memory device.

2. Related Art

A memory system is a device which stores data under the control of a host device such as a computer or a smartphone. The memory system may include a memory device in which data is stored and a memory controller which controls the memory device. Memory devices are classified into a volatile memory device and a nonvolatile memory device.

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

A program operation is an operation of increasing threshold voltages of memory cells included in the nonvolatile memory device. The degrees to which the threshold voltages of respective memory cells are increased may differ from each other depending on pieces of data to be stored in respective memory cells. During a program operation, when the threshold voltage of any one memory cell has increased to a threshold voltage corresponding to data to be stored therein, the threshold voltage of the one memory cell is not to be varied while the threshold voltage of an additional memory cell increases. However, since the threshold voltage of the one memory cell is also influenced while the threshold voltage of the additional memory cell increases, the reliability of data stored in the one memory cell may be decreased when variation in the threshold voltage of the one memory cell is severe.

SUMMARY

An embodiment of the present disclosure may provide for a memory device. The memory device may include memory cells coupled to a word line, a peripheral circuit configured to perform a program operation of increasing threshold voltages of the memory cells to threshold voltages corresponding to a target program state among a plurality of program states, and a program operation controller configured to, after the program operation is performed, determine whether to perform an erase state verify operation of identifying threshold voltages of erase cells having an erase state as the target program state among the memory cells depending on a magnitude of a program voltage applied to the word line.

An embodiment of the present disclosure may provide for a method of operating a memory device. The method may include performing a program operation of increasing threshold voltages of memory cells to threshold voltages corresponding to a target program state among a plurality of program states, and determining whether to perform an erase state verify operation of identifying threshold voltages of erase cells having an erase state as the target program state among the memory cells depending on a magnitude of a program voltage applied to a word line coupled to the memory cells.

An embodiment of the present disclosure may provide for a memory device. The memory device may include memory cells coupled to a word line, a peripheral circuit configured to perform a program operation of increasing threshold voltages of the memory cells to threshold voltages corresponding to a target program state among a plurality of program states by performing a plurality of program loops, and a program operation controller configured to determine whether to perform an erase state verify operation of identifying threshold voltages of erase cells having an erase state as the target program state among the memory cells depending on a number of times that the plurality of program loops have been performed.

An embodiment of the present disclosure may provide for a method of operating a memory device. The method may include performing a program operation of increasing threshold voltages of memory cells to threshold voltages corresponding to a target program state among a plurality of program states by performing a plurality of program loops, and determining whether to perform an erase state verify operation of identifying threshold voltages of erase cells having an erase state as the target program state among the memory cells depending on a number of times that the plurality of program loops have been applied to a word line coupled to the memory cells.

DETAILED DESCRIPTION

Specific structural or functional descriptions in the embodiments of the present disclosure introduced in this specification or application are provided as examples to describe embodiments according to the concepts of the present disclosure. The embodiments according to the concepts of the present disclosure may be practiced in various forms, and should not be construed as being limited to the embodiments described in the specification or application.

Various embodiments of the present disclosure are directed to a memory device that is capable of verifying the threshold voltages of memory cells in an erase state when there is a strong possibility that a disturbance phenomenon in which the threshold voltages of memory cells programmed to an erase state vary will occur during a program operation, and a method of operating the memory device.

Figure 1:
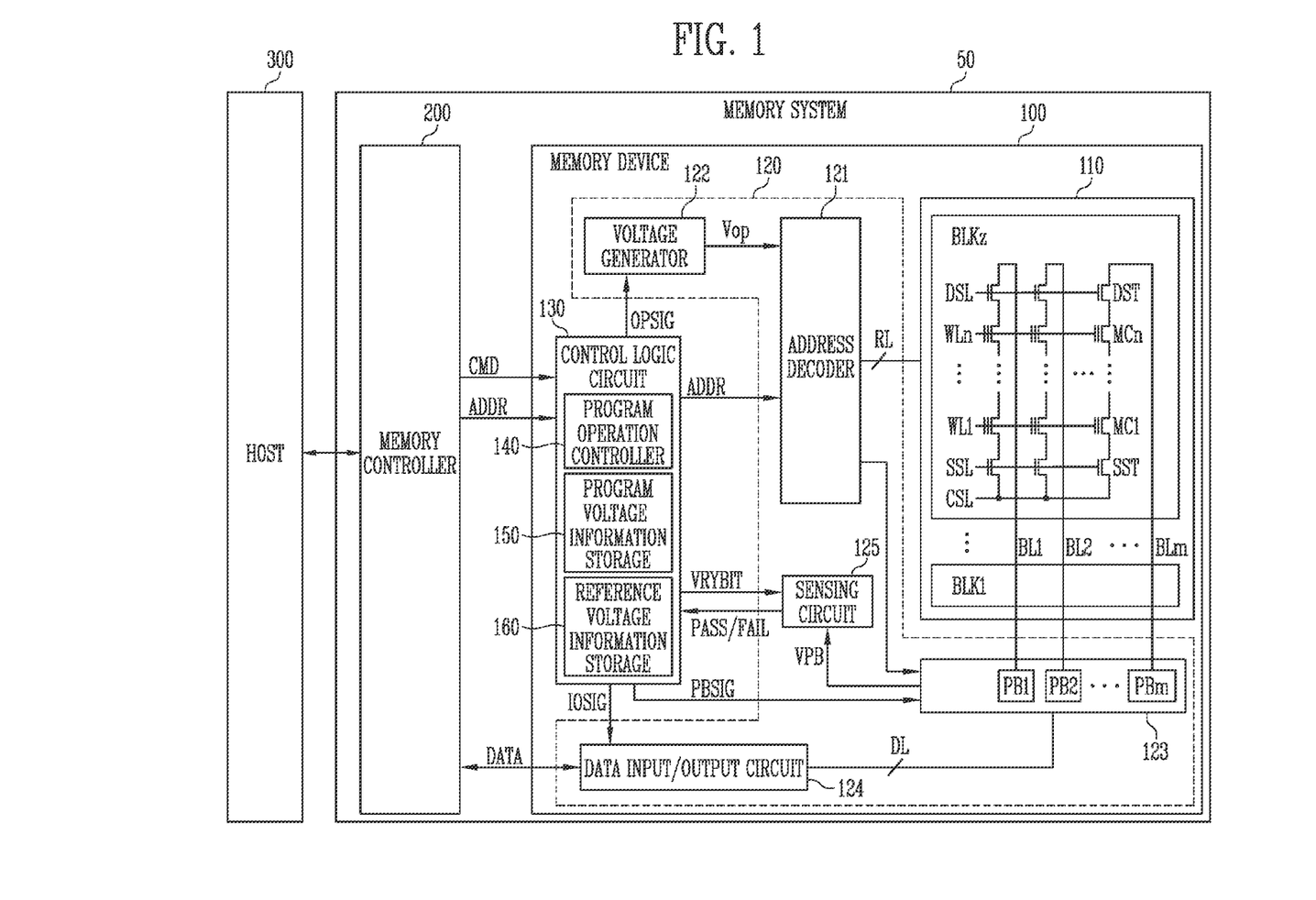
FIG. 1 is a diagram illustrating a memory system including a memory device according to an embodiment of the present disclosure.

FIG. 1 is a diagram illustrating a memory system including a memory device according to an embodiment of the present disclosure.

Referring to FIG. 1, a memory system 50 may include a memory device 100 and a memory controller 200. The memory system 50 may be a device which stores data under the control of a host 300 such as a mobile phone or a computer. The memory system 50 may be manufactured as any one of various types of storage devices depending on a host interface that is a scheme for communication with the host 300. The memory system 50 may be manufactured in any one of various package types, such as a package on package (POP) and a system on chip (SOC).

The memory device 100 may store data. The memory device 100 may be operated under the control of the memory controller 200. In an embodiment, the memory device 100 may be a volatile memory device or a nonvolatile memory device.

The memory device 100 may receive a command CMD and an address ADDR from the memory controller 200, and may access the area of the memory cell array, selected by the address ADDR. The memory device 100 may perform an operation indicated by the command CMD on the area selected by the address ADDR. The memory device 100 may perform a program operation (write operation) of storing data in the area selected by the address ADDR, a read operation of reading data, or an erase operation of erasing data.

In an embodiment, the memory device 100 may include a memory cell array 110, a peripheral circuit 120, and a control logic circuit 130.

The memory cell array 110 may include a plurality of memory blocks BLK1 to BLKz. The plurality of memory blocks BLK1 to BLKz may be coupled to an address decoder 121 through row lines RL. The plurality of memory blocks BLK1 to BLKz may be coupled to a page buffer group 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, may be defined as one page. That is, the memory cell array 110 may be composed of a plurality of pages. In an embodiment, a page may be the unit by which data is stored or stored data is read. A memory block may be the unit by which data is erased.

In an embodiment, any one memory block BLKz, among the plurality of memory blocks BLK1 to BLKz, may include a plurality of word lines WL1 to WLn arranged in parallel between a drain select line DSL and a source select line SSL. The memory block BLKz may include a plurality of memory cell strings coupled between any one bit line and a common source line CSL. The bit lines BL1 to BLm may be coupled to the plurality of memory cell strings, respectively, and the common source line CSL may be coupled in common to the plurality of memory cell strings.

For example, the memory cell string may include a drain select transistor DST, a plurality of memory cells MC1 to MCn, and a source select transistor SST, which are coupled in series to each other between the common source line CSL and the first bit line BL1. One memory cell string may include at least one drain select transistor DST and at least one source select transistor SST.

A drain of the drain select transistor DST may be coupled to the first bit line BL1, and a source of the source select transistor SST may be coupled to the common source line CSL. The plurality of memory cells MC1 to MCn may be coupled in series between the drain select transistor DST and the source select transistor SST. Gates of the source select transistors SST included in different memory cell strings may be coupled to the source select line SSL, gates of the drain select transistors DST included in different memory cell strings ST may be coupled to the drain select line DSL, and gates of the memory cells MC1 to MCn may be coupled to the plurality of word lines WL1 to WLn, respectively. Memory cells coupled to the same word line, among the memory cells included in different memory cell strings, may be defined as a 'physical page (PG)'. The memory block BLKz may include a number of physical pages identical to the number of word lines WL1 to WLn.

Each of the memory cells MC1 to MCn may be implemented as a single-level cell (SLC) capable of storing one bit of data, a multi-level cell (MLC) capable of storing two bits of data, a triple-level cell (TLC) capable of storing three bits of data, a quad-level cell (QLC) capable of storing four bits of data, or a memory cell capable of storing five or more bits of data.

The peripheral circuit 120 may drive the memory cell array 110. In an example, the peripheral circuit 120 may drive the memory cell array 110 so that a program operation, a read operation, and an erase operation are performed under the control of the control logic circuit 130. In an example, the peripheral circuit 120 may apply various operating voltages to the row lines RL and the bit lines BL1 to BLm or discharge the applied voltages under the control of the control logic circuit 130.

The peripheral circuit 120 may include the address decoder 121, a voltage generator 122, the page buffer group 123, a data input/output circuit 124, and a sensing circuit 125.

The address decoder 121 may be coupled to the memory cell array 110 through the row lines RL. The row lines RL may include drain select lines DSL, the plurality of word lines WL1 to WLn, source select lines SSL, and the common source line CSL.

The address decoder 121 may be operated in response to the control of the control logic circuit 130. The address decoder 121 may receive addresses ADDR from the control logic circuit 130.

The address decoder 121 may decode a block address, among the received addresses ADDR. The address decoder 121 may select at least one of the memory blocks BLK1 to BLKz according to the decoded block address. The address decoder 121 may decode a row address, among the received addresses ADDR. The address decoder 121 may select at least one word line WL of the selected memory block by applying voltages supplied from the voltage generator 122 to the at least one word line WL according to the decoded row address.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to unselected word lines.

The address decoder 121 may decode a column address among the received addresses ADDR. The decoded column address may be transferred to the page buffer group 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic circuit 130.

In an embodiment, the voltage generator 122 may generate an internal supply voltage by regulating the external supply voltage. The internal supply voltage generated by the voltage generator 122 may be used as an operating voltage for the memory device 100.

In an embodiment, the voltage generator 122 may generate various operating voltages Vop that are used for program, read, and erase operations in response to an operation signal OPSIG. The voltage generator 122 may generate the plurality of operating voltages Vop using the external supply voltage or the internal supply voltage. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of operating voltages Vop having various voltage levels, and may generate the plurality of operating voltages Vop by selectively enabling the plurality of pumping capacitors under the control of the control logic circuit 130.

The generated operating voltages Vop may be supplied to the memory cell array 110 by the address decoder 121.

The page buffer group 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may be operated under the control of the control logic circuit 130.

The first to m-th page buffers PB1 to PBm may transmit/receive data DATA to/from the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transfer data DATA, received through the data input/output circuit 124, to selected memory cells through the bit lines BL1 to BLm. The selected memory cells may be programmed based on the received data DATA. Memory cells coupled to a bit line to which a program-enable voltage (e.g., a ground voltage) is applied may have increased threshold voltages. The threshold voltages of memory cells coupled to a bit line to which a program-inhibit voltage (e.g., a supply voltage) is applied may be maintained. During a verify operation, the first to m-th page buffers PB1 to PBm may read the data DATA stored in the selected memory cells from the selected memory cells through the bit lines BL1 to BLm.

The data input/output circuit 124 may be coupled to the first to m-th page buffers PB1 to PBm through the data lines DL. The data input/output circuit 124 may be operated under the control of the control logic circuit 130.

The data input/output circuit 124 may include a plurality of input/output buffers (not illustrated) which receive input data DATA. During a program operation, the data input/output circuit 124 may receive the data DATA from the memory controller 200.

During a read operation or a verify operation, the sensing circuit 125 may generate a reference current in response to an enable bit signal VRYBIT generated by the control logic circuit 130, and may output a pass signal or a fail signal to the control logic circuit 130 by comparing a sensing voltage VPB received from the page buffer group 123 with a reference voltage generated by the reference current. In an example, the sensing circuit 125 may output a fail signal to the control logic circuit 130 when the magnitude of the sensing voltage VPB is greater than that of the reference voltage. In an example, the sensing circuit 125 may output a pass signal to the control logic circuit 130 when the magnitude of the sensing voltage VPB is less than that of the reference voltage.

The control logic circuit 130 may be coupled to the address decoder 121, the voltage generator 122, the page buffer group 123, the data input/output circuit 124, and the sensing circuit 125. The control logic circuit 130 may control the overall operation of the memory device 100. The control logic circuit 130 may be operated in response to the command CMD received from the memory controller 200.

The control logic circuit 130 may control the peripheral circuit 120 by generating various types of signals in response to the command CMD and the address ADDR. For example, the control logic circuit 130 may generate the operation signal OPSIG, the addresses ADDR, page buffer control signals PBSIG, and the enable bit signal VRYBIT in response to the command CMD and the address ADDR. The control logic circuit 130 may output the operation signal OPSIG to the voltage generator 122, may output the addresses ADDR to the address decoder 121, may output the page buffer control signals PBSIG to the page buffer group 123, and may output the enable bit signal VRYBIT to the sensing circuit 125. In addition, the control logic circuit 130 may determine whether a verify operation has passed or failed in response to the pass or fail signal PASS or FAIL output from the sensing circuit 125.

In an embodiment, the control logic circuit 130 may include a program operation controller 140, a program voltage information storage 150, and a reference voltage information storage 160. The program operation controller 140 may control a program operation performed on memory cells. The program operation may be an operation of storing data in the memory cells. For example, the program operation may be an operation of increasing the threshold voltages of memory cells depending on the data to be stored in the memory cells. When the program operation is performed, each of the memory cells may have a threshold voltage corresponding to any one of a plurality of program states. The plurality of program states may be defined depending on the number of data bits stored in one memory cell. For example, when data is programmed according to a triple-level cell (TLC) scheme in which three bits of data are stored in one memory cell, the plurality of program states may indicate an erase state and first to seventh program states. After the program operation is performed, the threshold voltages of the memory cells may be determined depending on the data to be stored in the memory cells. Each of the memory cells may have any one of the plurality of program states as a target program state depending on the data to be stored in the corresponding memory cell.

In an embodiment, the program operation may include a plurality of program loops. Each program loop may include a program voltage apply operation and a verify operation. The program voltage apply operation may be an operation of increasing the threshold voltages of memory cells using a program voltage. The program operation controller 140 may control the peripheral circuit 120 to apply the program voltage to the corresponding word line during the program voltage apply operation. The verify operation may be an operation of identifying, using a verify voltage, whether the threshold voltages of the memory cells have reached threshold voltages corresponding to a target program state. During the verify operation, the program operation controller 140 may determine whether the verify operation has passed or failed based on the result of comparing the number of on-cells having threshold voltages lower than the verify voltage, among the memory cells, with the reference number of fail bits.

When the memory cells have passed the verify operation for each target program state, the program operation controller 140 may determine whether to perform an erase state verify operation of identifying the threshold voltages of erase cells having the erase state as a target program state, among the memory cells. For example, the program operation controller 140 may determine whether to perform the erase state verify operation based on the result of comparing the magnitude of the program voltage applied to the word line during the program voltage apply operation with the magnitude of a reference voltage. The program operation controller 140 may determine whether the erase state verify operation has passed or failed based on the result of comparing the number of off-cells having threshold voltages higher than an erase state verify voltage, among the erase cells, with the reference number of off-cells during the erase state verify operation.

The program voltage information storage 150 may store information about program voltages applied to the word line during the program operation and information about the number of times that a plurality of program loops are performed during the program operation. The reference voltage information storage 160 may store information about the magnitude of the reference voltage.

In an embodiment, the program operation controller 140 may determine whether to perform the erase state verify operation based on the result of comparing the program voltages stored in the program voltage information storage 150 with the reference voltage stored in the reference voltage information storage 160.

The memory controller 200 may control the overall operation of the memory system 50.

The memory controller 200 may control the memory device 100 so that a write operation, a read operation or an erase operation is performed in response to a request received from the host 300. The memory controller 200 may provide a command, an address or data to the memory device 100 depending on the write operation, the read operation or the erase operation.

In an embodiment, the memory controller 200 may internally generate a command, an address, and data regardless of whether a request from the host 300 is received, and may transmit them to the memory device 100. For example, the memory controller 200 may provide the memory device 100 with commands, addresses, and data required in order to perform read operations and write operations that are involved in performing wear leveling, read reclaim, garbage collection, etc.

In an embodiment, the memory controller 200 may control two or more memory devices 100. In this case, in an embodiment, the memory controller 200 may control the memory devices 100 depending on an interleaving scheme to improve operating performance. The interleaving scheme may be a scheme for controlling the memory devices 100 so that the operations of at least two memory devices 100 are caused to overlap each other.

The host 300 may communicate with the memory system 50 using various communication schemes such as dual in-line memory module (DIMM).

Figure 2:
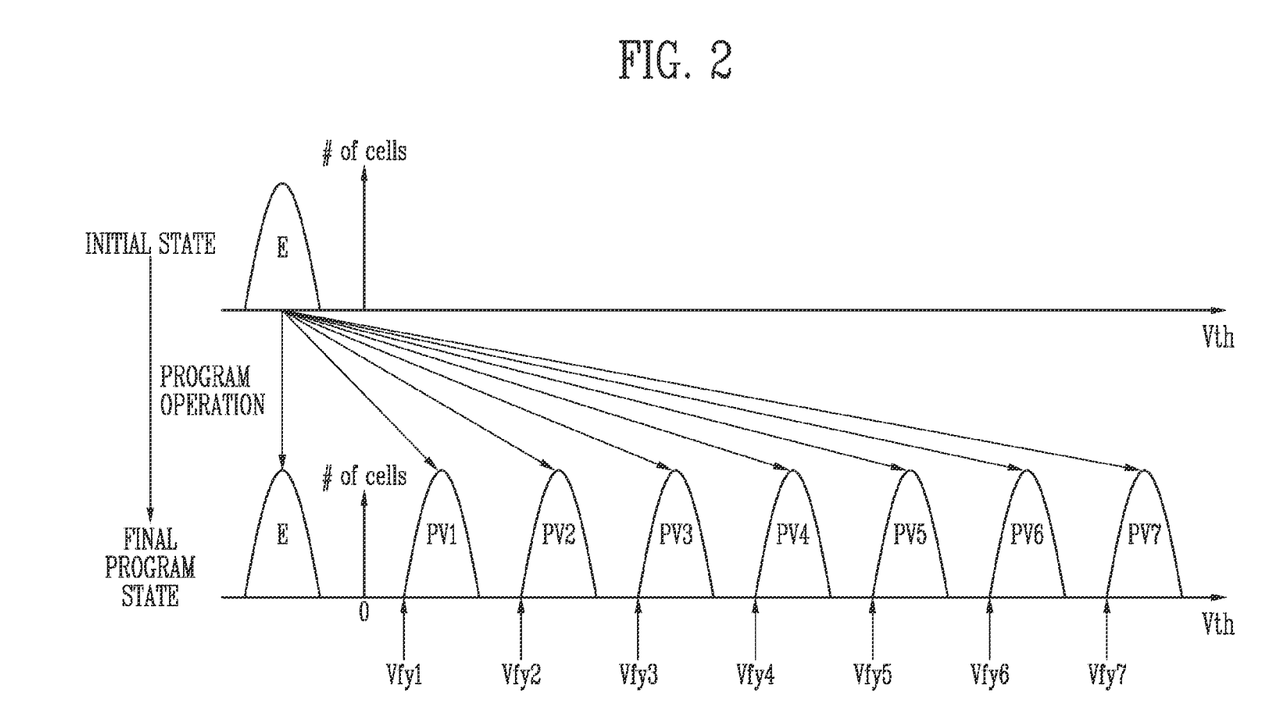
FIG. 2 is a diagram illustrating threshold voltage distributions of memory cells depending on a program operation of a memory device.

FIG. 2 is a diagram illustrating threshold voltage distributions of memory cells depending on a program operation of a memory device.

In FIG. 2, the horizontal axis of each graph indicates threshold voltages Vth of memory cells, and the vertical axis thereof indicates the number of memory cells (# of cells).

Referring to FIG. 2, the threshold voltage distributions of memory cells may change from an initial state to a final program state depending on the program operation.

In FIG. 2, a description is made on the assumption that data is programmed according to a TLC scheme in which one memory cell stores three bits of data.

The initial state may be a state in which a program operation is not performed and in which the threshold voltage distribution of memory cells is in an erase state E.

The final program state may be the threshold voltage distribution of memory cells on which a program operation is performed. The memory cells on which the program operation is performed may have threshold voltages corresponding to any one of a plurality of program states. For example, when data is programmed according to a triple-level cell (TLC) scheme in which three bits of data are stored in one memory cell, the plurality of program states may indicate the erase state E and first to seventh program states PV1 to PV7. In an embodiment, the memory cells on which the program operation is performed may have threshold voltages corresponding to any one of the erase state E and the first to seventh program states PV1 to PV7. The threshold voltage of each memory cell in the initial state may be increased to the threshold voltage corresponding to any one of the erase state E and the first to seventh program states PV1 to PV7 through the program operation.

Each memory cell may have any one of the erase state E and the program states PV1 to PV7 as a target program state. The target program state may be determined depending on the data to be stored in the corresponding memory cell. Each memory cell may have any one of the erase state E and the first to seventh program states PV1 to PV7, which are the plurality of program states, as the target program state depending on the data to be stored. Each memory cell may have a threshold voltage corresponding to the target program state, among the plurality of program states, depending on the program operation.

Figure 3:
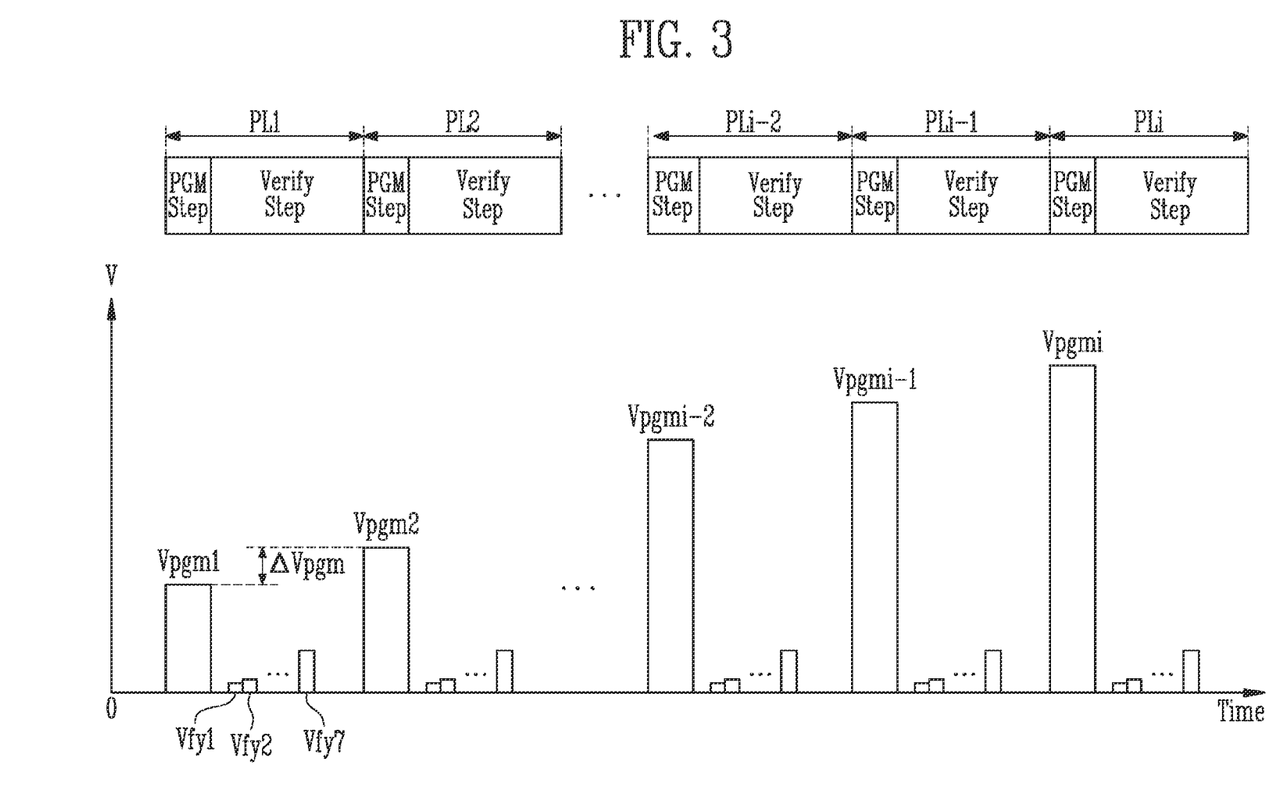
FIG. 3 is a diagram illustrating a program operation of a memory device.

FIG. 3 is a diagram illustrating a program operation of a memory device.

In FIG. 3, the horizontal axis of a graph indicates time and the vertical axis thereof indicates voltage V applied to a word line. The voltage V applied to the word line may include a program voltage Vpgm and a verify voltage Vfy.

In FIG. 3, a description is made on the assumption that data is programmed according to a TLC scheme in which one memory cell stores three bits of data. However, the scope of the present disclosure is not limited thereto, and one memory cell may be programmed to store two bits of data or to store four or more bits of data.

Referring to FIG. 3, the memory device 100 may perform a program operation. The program operation may include a plurality of program loops PL1 to PLi. The memory device 100 may perform the plurality of program loops PL1 to PLi so that selected memory cells coupled to a selected word line have threshold voltages corresponding to any one of the plurality of program states. The one program state may be the target program state determined depending on the data to be stored in each of the selected memory cells.

Each of the plurality of program loops PL1 to PLi may include a program voltage apply operation (PGM Step) and a verify operation (Verify Step).

The program voltage apply operation (PGM Step) may be an operation of applying a program voltage to the selected word line coupled to the selected memory cells. In the program voltage apply operation (PGM Step), threshold voltages of the selected memory cells may be increased by the program voltage.

The verify operation (Verify Step) may be an operation of applying a verify voltage to the selected word line coupled to the selected memory cells. The verify operation (Verify step) may be an operation of determining whether respective threshold voltages of the selected memory cells are threshold voltages corresponding to the target program state, among the plurality of program states. The verify operation (Verify Step) may be an operation of applying verify voltages corresponding to respective target program states of the selected memory cells.

In an embodiment, in the first program loop PL1, after a first program voltage Vpgm1 is applied to the selected word line coupled to the selected memory cells, the memory device 100 may apply first to seventh verify voltages Vfy1 to Vfy7 to the selected word line. The memory device 100 may apply a verify voltage corresponding to the target program state of the memory cells, among the first to seventh verify voltages Vfy1 to Vfy7, to the selected word line. For example, the memory device 100 may perform the verify operation (Verify Step) on the memory cells having the first program state as the target program state using the first verify voltage Vfy1. The first verify voltage Vfy1 may be a verify voltage corresponding to the first program state illustrated in FIG. 2. The magnitudes of the verify voltages Vfy1 to Vfy7 may increase in the direction from the first verify voltage Vfy1 to the seventh verify voltage Vfy7. For example, for the magnitudes of the verify voltages Vfy1 to Vfy7, the first verify voltage Vfy1 may be the lowest, and the seventh verify voltage Vfy7 may be the highest. The number of verify voltages is not limited to the present embodiments.

It may be determined that the memory cells having passed the verify operation (verify step) using respective verify voltages Vfy1 to Vfy7 have threshold voltages corresponding to the target program states. The memory cells having passed the verify operation (Verify Step) may be program-inhibited in the second program loop PL2. A program-inhibit voltage may be applied to bit lines coupled to the program-inhibited memory cells.

It may be determined that the memory cells having failed the verify operation (Verify Step) using respective verify voltages Vfy1 to Vfy7 do not have threshold voltages corresponding to the target program states. The memory cells having failed the verify operation (Verify Step) may perform the second program loop PL2.

In the second program loop PL2, the memory device 100 may apply a second program voltage Vpgm2, higher than the first program voltage Vpgm1 by a unit voltage $\Delta$Vpgm, to the selected word line coupled to the selected memory cells. Thereafter, the memory device 100 may perform the verify operation (Verify Step) of the second program loop PL2 in the same manner as the verify operation (Verify Step) of the first program loop PL1.

Thereafter, the memory device 100 may perform a subsequent program loop in the same manner as the second program loop PL2 a preset number of times. The word "preset" as used herein with respect to a parameter, such as a preset number of times or preset number of program loops, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In an embodiment, when the program operation is not completed within a preset number of program loops, the program operation may fail. When the program operation is completed within a preset number of program loops, the program operation may pass. Whether the program operation is completed may be determined depending on whether all of the selected memory cells have passed the verify operation (Verify Step). When all of the selected memory cells have passed the verify operation (Verify Step), a subsequent program loop might not be performed.

In an embodiment, the program voltage may be determined based on an incremental step pulse programming (ISPP) method. The level of the program voltage may be stepwise increased or decreased as the program loops PL1 to PLi are repeated. The number of times that program voltages used in each program loop are applied, the voltage levels of the program voltages, voltage apply times, etc. may be determined in various forms under the control of the memory controller 200.

Figure 4:
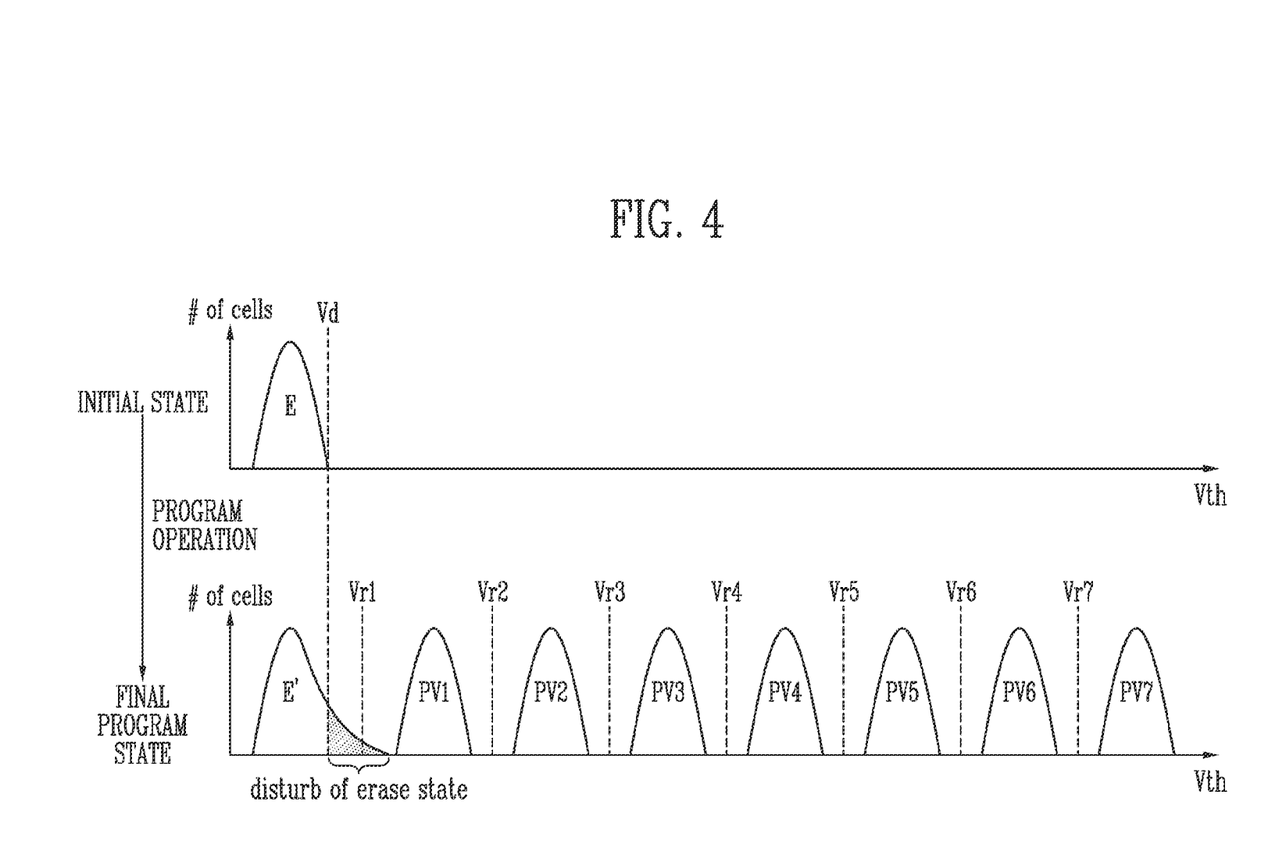
FIG. 4 is a diagram illustrating memory cells in an erase state in which threshold voltages vary depending on a program operation of a memory device.

FIG. 4 is a diagram illustrating memory cells in an erase state in which threshold voltages vary depending on a program operation of a memory device.

In FIG. 4, the horizontal axis of each graph indicates threshold voltages Vth of memory cells, and the vertical axis thereof indicates the number of memory cells (# of cells).

The memory device 100 may perform a program operation so the memory cells have threshold voltages corresponding to the target program states, among the plurality of program states.

When the program operation is terminated, the memory device 100 may perform a read operation of reading data stored in the memory cells using first to seventh read voltages Vr1 to Vr7. Each of the first to seventh read voltages Vr1 to Vr7 may be a voltage for distinguishing program states from each other. For example, the first read voltage may be a voltage for distinguishing the erase state E from the first program state PV1.

Meanwhile, threshold voltages of erase cells having the erase state E as the target program state, among the memory cells, are not to be increased during the program operation. That is, the threshold voltage distribution of erase cells having the erase state E as the target program state needs to be formed in a shape identical to that of a threshold voltage distribution corresponding to the erase state E in the initial state. For example, the threshold voltages of erase cells need to be lower than a disturbance voltage Vd even if the program operation is terminated. Accordingly, the memory device 100 may prevent or mitigate the threshold voltages of erase cells from being increased by applying a program-inhibit voltage to bit lines coupled to the erase cells during the program operation.

However, the magnitude of the program voltage applied to a word line and the number of times that the program voltage is applied in the program operation may influence the threshold voltage distribution of erase cells. After the program operation is terminated, the threshold voltage distribution of the erase cells may be changed to a threshold voltage distribution in a changed erase state E', as illustrated in FIG. 4. For example, erase cells having threshold voltages higher than the disturbance voltage Vd may occur depending on the magnitude of the program voltage applied to the word line and the number of times that the program voltage is applied. Furthermore, as the magnitude of the program voltage applied to the word line in the program operation is larger, the number of erase cells having threshold voltages higher than the disturbance voltage Vd may increase. Further, as the number of times that the program voltage is applied to the word line in the program operation is greater, the number of erase cells having threshold voltages higher than the disturbance voltage Vd may increase.

When the threshold voltages of the erase cells are higher than the first read voltage Vr1, the erase cells may be read as memory cells having the first program state PV1. That is, as the number of erase cells having threshold voltages higher than the first read voltage Vr1 is larger, more error bits may be included in data, and thus a read operation using the first read voltage Vr1 may fail.

Therefore, the memory device 100 performs an erase state verify operation of identifying the threshold voltages of erase cells depending on the magnitude of the program voltage applied to the word line or the number of times that the program voltage is applied in the program operation, thus preventing or mitigating the read operation from failing. The erase state verify operation may be an operation of identifying the threshold voltages of the erase cells using an erase state verify voltage. For example, the erase state verify operation may be an operation of identifying whether the erase cells have threshold voltages higher than the erase state verify voltage. In an embodiment, the erase state verify voltage may be a voltage lower than the first verify voltage Vfy1 illustrated in FIG. 2. In an embodiment, the erase state verify voltage may be the disturbance voltage Vd or the first read voltage Vr1. In an embodiment, the erase state verify voltage may be a voltage having a magnitude between the disturbance voltage Vd and the first read voltage Vr1.

Figure 5:
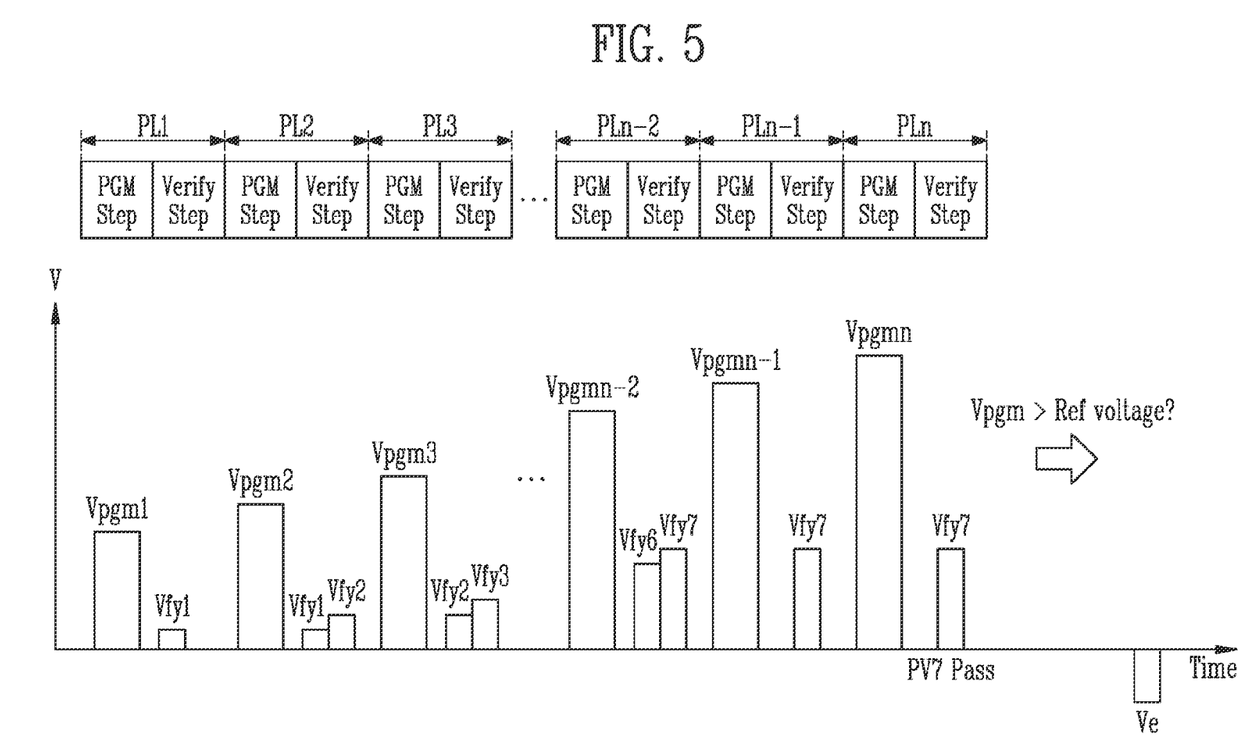
FIG. 5 is a diagram illustrating an erase state verify operation of a memory device.

FIG. 5 is a diagram illustrating the erase state verify operation of a memory device.

In FIG. 5, the horizontal axis of a graph indicates time and the vertical axis thereof indicates voltage V applied to a word line. The voltage V applied to the word line may include a program voltage Vpgm and a verify voltage Vfy.

Referring to FIG. 5, the memory device 100 may perform a plurality of program loops PL1 to PLn. Each of the plurality of program loops PL1 to PLn may include a program voltage apply operation (PGM Step) and a verify operation (Verify Step). The memory device 100 may increase threshold voltages of selected memory cells by applying a program voltage to a selected word line coupled to the selected memory cells in the program voltage apply operation (PGM Step). As the plurality of program loops PL1 to PLn are performed, the magnitude of the program voltage applied to the selected word line may increase.

The memory device 100 may identify whether the threshold voltages of the selected memory cells have increased to threshold voltages corresponding to target program states using verify voltages corresponding to respective program states in the verify operation (Verify Step).

The memory device 100 may perform the verify operation (Verify Step) on the memory cells having the first program state as the target program state using a first verify voltage Vfy1 in first and second program loops PL1 and PL2. When the memory cells having the first program state as the target program state have passed the verify operation (Verify Step), the memory device 100 may perform the verify operation (Verify Step) on memory cells having the second program state as the target program state using a second verify voltage Vfy2 in the third program loop PL3. In the same manner, the memory device 100 may perform the verify operation on memory cells having each of third to seventh program states as the target program state.

In an embodiment, in the n-th program loop PLn, memory cells having the seventh program state as the target program states may pass the verify operation (Verify Step). When the memory cells have passed the verify operation for the seventh program state, it may be determined that respective selected memory cells have threshold voltages corresponding to the target program states.

In an embodiment, after passing the verify operation for the seventh program state, the memory device 100 may determine whether to perform an erase state verify operation on erase cells having the erase state as the target program state based on the result of comparing a program voltage having the largest magnitude (i.e., a highest program voltage), among the program voltages applied to the selected word line, with a reference voltage. In an embodiment, among the first to n-th program voltages Vpgm1 to Vpgmn, the program voltage having the largest magnitude may be the n-th program voltage Vpgmn. In an embodiment, because the memory device 100 passes the verify operation for the seventh program state after the program voltages up to the n-th program voltage Vpgmn are applied to the selected word line, the memory device 100 may perform the erase state verify operation based on the result of comparing the n-th program voltage Vpgmn with the reference voltage. In an embodiment, unlike the example illustrated in FIG. 5, when the memory device passes the verify operation for the seventh program state after program voltages up to an n−1-th program voltage Vpgmn−1 are applied to the selected word line, the memory device 100 may determine whether to perform the erase state verify operation based on the result of comparing the n−1-th program voltage Vpgmn−1 with the reference voltage.

In an embodiment, the memory device 100 may perform the erase state verify operation when the program voltage having the largest magnitude, among the program voltages applied to the selected word line, is higher than the reference voltage. The memory device 100 may apply an erase state verify voltage Ve to the selected word line in the erase state verify operation. The memory device 100 may identify whether erase cells having the erase state as the target program state have threshold voltages higher than the erase state verify voltage Ve. In an embodiment, the erase state verify voltage Ve may be a negative voltage.

In an embodiment, the memory device 100 might not perform an erase state verify operation when the program voltage having the largest magnitude, among the program voltages applied to the selected word line, is lower than or equal to the reference voltage.

In an embodiment, the memory device 100 may determine whether to perform an erase state verify operation based on the result of comparing the number of times that the plurality of program loops are performed until the verify operation for the seventh program state passes with the reference number of loops. For example, the memory device 100 may perform the erase state verify operation when the number of times that the plurality of program loops are performed is greater than the reference number of loops. In an example, the memory device 100 might not perform the erase state verify operation when the number of times that the plurality of program loops are performed is less than or equal to the reference number of loops.

Figure 6:
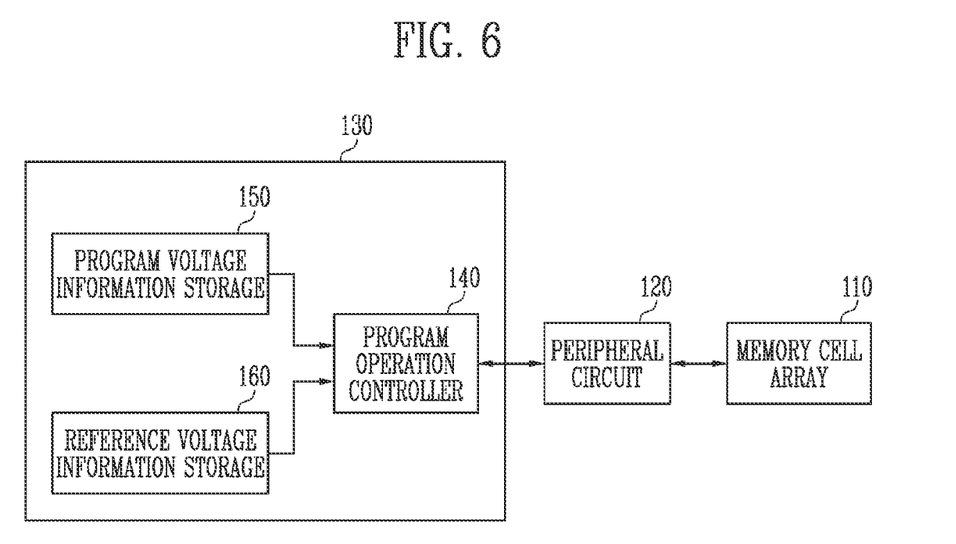
FIG. 6 is a diagram illustrating a program operation and an erase state verify operation of a memory device.

FIG. 6 is a diagram illustrating the program operation and the erase state verify operation of a memory device.

Referring to FIG. 6, the memory device 100 of FIG. 1 may include a memory cell array 110, a peripheral circuit 120, and a control logic circuit 130. The memory cell array 110, the peripheral circuit 120, and the control logic circuit 130 may be implemented in the same manner as the memory cell array 110, the peripheral circuit 120, and the control logic circuit 130 illustrated in FIG. 1.

The control logic circuit 130 may include a program operation controller 140, a program voltage information storage 150, and a reference voltage information storage 160.

The program voltage information storage 150 may store information about program voltages applied to a word line during a program operation. The program voltage information storage 150 may store information about the number of times that a plurality of program loops are performed during a program operation.

The reference voltage information storage 160 may store information about the magnitude of a reference voltage that is a basis for determining whether to perform an erase state verify operation.

The program operation controller 140 may control the peripheral circuit 120 to perform a program operation on memory cells included in the memory cell array. The program operation controller 140 may control the peripheral circuit 120 so that each of memory cells has a threshold voltage corresponding to a target program state.

The program operation controller 140 may determine whether to perform an erase state verify operation when each of the memory cells has passed a verify operation for the target program state. In an example, the program operation controller 140 may determine whether to perform an erase state verify operation when the memory cells have passed the verify operation for a seventh program state. For example, the program operation controller 140 may determine whether to perform an erase state verify operation based on the result of comparing the program voltage having the largest magnitude (i.e., the highest program voltage), among program voltages stored in the program voltage information storage 150, with the reference voltage. In an embodiment, the program operation controller 140 may perform the erase state verify operation when the program voltage having the largest magnitude is higher than the reference voltage. In an embodiment, the program operation controller 140 may terminate the program operation without performing an erase state verify operation when the program voltage having the largest magnitude is lower than or equal to the reference voltage.

The program operation controller 140 may identify whether the threshold voltages of erase cells having the erase state as the target program state are higher than the erase state verify voltage in the erase state verify operation. Erase cells having threshold voltages higher than the erase state verify voltage may be identified as off-cells. Erase cells having threshold voltages lower than the erase state verify voltage may be identified as on-cells. The program operation controller 140 may determine whether the erase state verify operation has passed or failed based on the result of comparing the number of off-cells having threshold voltages higher than the erase state verify voltage, among the erase cells, with the reference number of off-cells. In an embodiment, the program operation controller 140 is configured to, when the number of off-cells is greater than the number of on-cells, determine that the erase state verify operation has failed. In an embodiment, the program operation controller 140 is configured to, when the number of off-cells is greater than the number of on-cells by a reference number greater than 1, determine that the erase state verify operation has failed.

In an embodiment, the program operation controller 140 may determine that the erase state verify operation has failed when the number of off-cells is greater than the reference number of off-cells. When the erase state verify operation has failed, the program operation controller 140 may control the peripheral circuit 120 to re-perform a program operation on additional memory cells other than the memory cells on which the program operation is performed.

In an embodiment, the program operation controller 140 may determine that the erase state verify operation has passed when the number of off-cells is less than or equal to the reference number of off-cells. When the erase state verify operation has passed, the program operation may be terminated.

Figure 7:
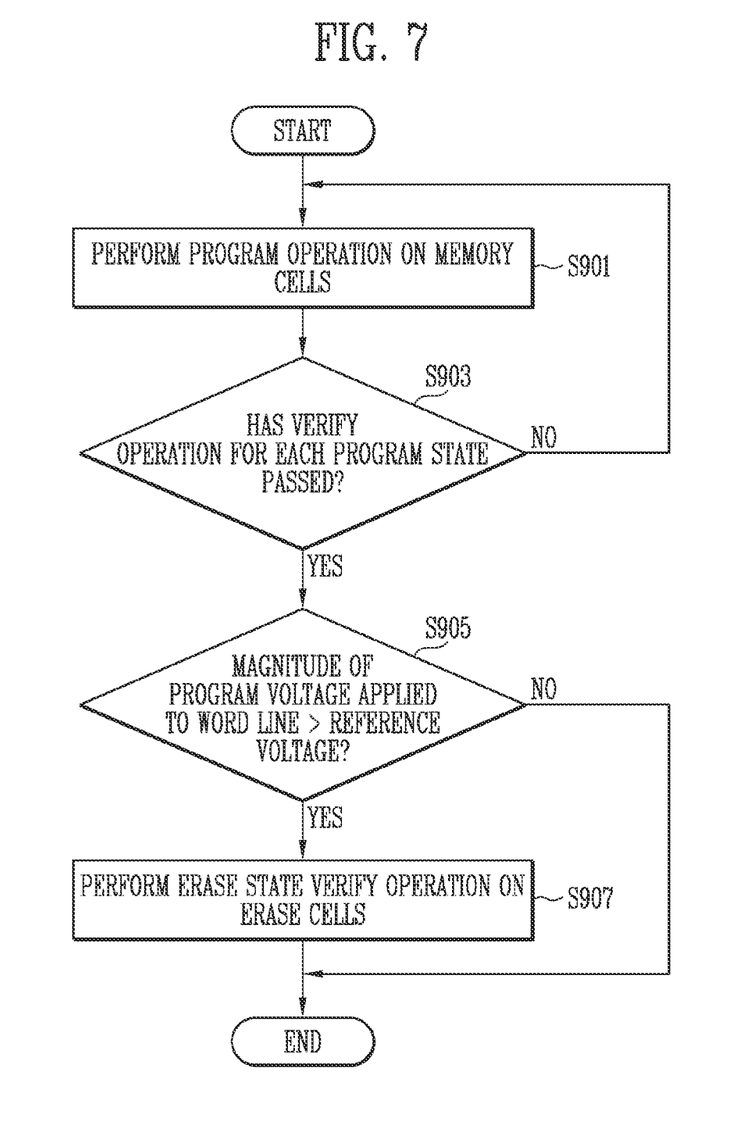
FIG. 7 is a flowchart illustrating an erase state verify operation of a memory device.

FIG. 7 is a flowchart illustrating the erase state verify operation of a memory device.

Referring to FIG. 7, at step S901, the memory device 100 may perform a program operation on memory cells. The program operation may be an operation of increasing threshold voltages of memory cells so that each of the memory cells has a threshold voltage corresponding to a target program state. The program operation may include a program voltage apply operation and a verify operation.

At step S903, the memory device 100 may determine whether a verify operation for each program state has passed. When the verify operation for each program state has passed, step S905 may be performed. On the other hand, when the verify operation for each program state has not passed, the program operation may be performed on the memory cells.

At step S905, the memory device 100 may compare the magnitude of the program voltage applied to a word line with that of a reference voltage so as to determine whether the magnitude of the program voltage is greater than that of the reference voltage. Here, the magnitude of the program voltage applied to the word line may refer to the program voltage having the largest magnitude, among the program voltages applied to the word line in each of the plurality of program loops. When the magnitude of the program voltage applied to the word line is greater than that of the reference voltage, step S907 may be performed. On the other hand, when the magnitude of the program voltage applied to the word line is less than or equal to that of the reference voltage, the program operation may be terminated.

At step S907, the memory device 100 may perform an erase state verify operation on the erase cells. The erase cells may be memory cells having an erase state as a target program state in the program operation.

Figure 8:
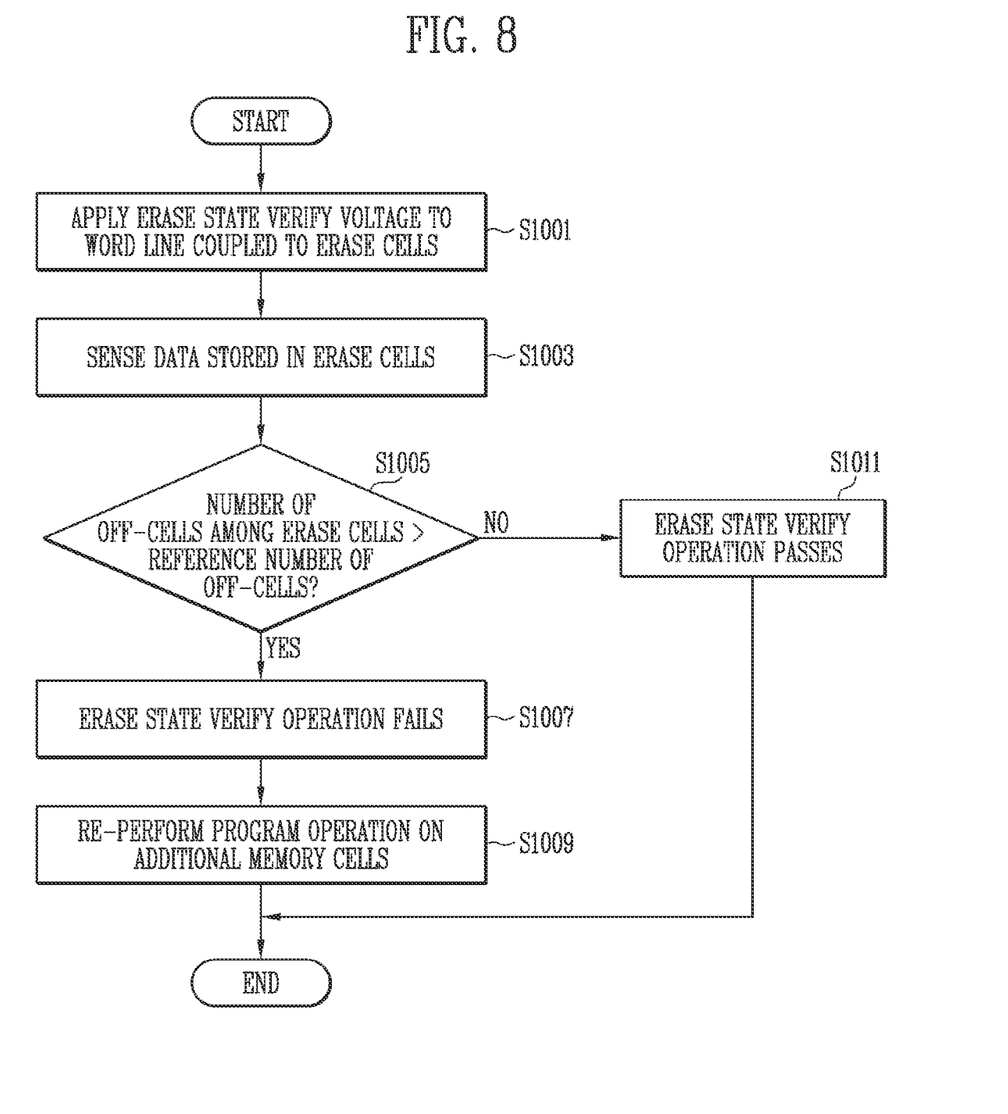
FIG. 8 is a flowchart illustrating pass or fail in an erase state verify operation.

FIG. 8 is a flowchart illustrating pass or fail in the erase state verify operation.

In an embodiment, the flowchart of FIG. 8 may indicate a process of embodying the erase state verify operation at step S907 of FIG. 7.

Referring to FIG. 8, at step S1001, the memory device 100 may apply an erase state verify voltage to a word line coupled to erase cells. The erase cells may be memory cells having an erase state as a target program state in the program operation.

At step S1003, the memory device 100 may sense data stored in the erase cells. In an embodiment, data corresponding to off-cells may be sensed from memory cells having threshold voltages higher than the erase state verify voltage, among the erase cells. In an embodiment, data corresponding to on-cells may be sensed from memory cells having threshold voltages lower than the erase state verify voltage, among the erase cells.

At step S1005, the memory device 100 may compare the number of off-cells, among the erase cells, with the reference number of off-cells. When the number of off-cells is greater than the reference number of off-cells, step S1007 may be performed. On the other hand, when the number of off-cells is less than or equal to the reference number of off-cells, step S1011 may be performed.

At step S1007, the memory device 100 may determine that the erase state verify operation has failed when the number of off-cells, among the erase cells, is greater than the reference number of off-cells.

At step S1009, the memory device 100 may re-perform the program operation on additional memory cells when the erase state verify operation fails.

At step S1011, the memory device 100 may determine that the erase state verify operation has passed when the number of off-cells, among the erase cells, is less than or equal to the reference number of off-cells.

In accordance with various embodiments of the present disclosure, there are provided memory devices that are capable of verifying the threshold voltages of memory cells in an erase state when there is a strong possibility that a disturbance phenomenon in which the threshold voltages of memory cells programmed to an erase state vary will occur during a program operation, and a method of operating the memory device.

What is claimed is:

1. A memory device, comprising:
   memory cells coupled to a word line;
   a peripheral circuit configured to perform a program operation of increasing threshold voltages of the memory cells to threshold voltages corresponding to a target program state among a plurality of program states; and
   a program operation controller configured to, after the program operation is performed, determine whether to perform an erase state verify operation of identifying threshold voltages of erase cells having an erase state as the target program state among the memory cells depending on a highest voltage among program voltages applied to the word line in the program operation,
   wherein the program operation controller is configured to determine whether to perform the erase state verify operation based on a result of comparing the magnitude of the highest voltage among the program voltages with the magnitude of the reference voltage.

2. The memory device according to claim 1, further comprising:
   a program voltage information storage configured to store information about the magnitude of the program voltages applied to the word line; and
   a reference voltage information storage configured to store information about a magnitude of a reference voltage.

3. The memory device according to claim 1,
   wherein the program operation controller is configured to control the peripheral circuit to perform the erase state verify operation when the magnitude of the highest voltage among the program voltages is greater than the magnitude of the reference voltage.

4. The memory device according to claim 3,
   wherein the program operation controller is configured to determine whether the erase state verify operation has passed based on a number of off-cells having threshold voltages higher than an erase state verify voltage among the erase cells.

5. The memory device according to claim 4,
   wherein the program operation controller is configured to, when the number of off-cells is greater than a reference number of off-cells, determine that the erase state verify operation has failed.

6. The memory device according to claim 4,
   wherein the program operation controller is configured to, when the number of off-cells is greater than the number of on-cells, determine that the erase state verify operation has failed, and
   wherein the on-cells have threshold voltages lower than the erase state verify voltage among the erase cells.

7. The memory device according to claim 4,
   wherein the program operation controller is configured to, when the number of off-cells is greater than the number of on-cells by a reference number greater than 1, determine that the erase state verify operation has failed, and
   wherein the on-cells have threshold voltages lower than the erase state verify voltage among the erase cells.

8. The memory device according to claim 4,
   wherein the program operation controller is configured to control the peripheral circuit to re-perform the program operation on additional memory cells other than the memory cells when the erase state verify operation has failed.

9. The memory device according to claim 1,
   wherein the program operation comprises a plurality of program loops, and
   wherein the highest voltage is a voltage having a largest magnitude among program voltages used in each of the plurality of program loops.

10. The memory device according to claim 1,
    wherein the program operation controller is configured to, when a verify operation for a program state having a highest threshold voltage among the plurality of program states has passed, determine whether to perform the erase state verify operation.

11. The memory device according to claim 1,
    wherein the erase state verify operation is an operation of identifying threshold voltages of the erase cells using an erase state verify voltage lower than a verify voltage used for a verify operation on the memory cells.

12. A method of operating a memory device, comprising:
    performing a program operation of increasing threshold voltages of memory cells to threshold voltages corresponding to a target program state among a plurality of program states; and
    determining whether to perform an erase state verify operation of identifying threshold voltages of erase cells having an erase state as the target program state among the memory cells depending on a highest voltage among program voltages applied to a word line coupled to the memory cells in the program operation, wherein whether to perform the erase state verify operation is determined based on a result of comparing the magnitude of the highest voltage among the program voltages with a magnitude of a reference voltage.

13. The method according to claim 12, wherein, when the magnitude of the highest voltage among the program voltages is greater than the magnitude of the reference voltage, the erase state verify operation is performed.

14. The method according to claim 13, wherein whether the erase state verify operation has passed is determined based on a number of off-cells having threshold voltages higher than an erase state verify voltage among the erase cells.

15. The method according to claim 14, wherein when the number of off-cells is greater than a reference number of off-cells, the erase state verify operation fails.

16. The method according to claim 14, wherein, when the number of off-cells is less than or equal to a reference number of off-cells, the erase state verify operation passes.

17. The method according to claim 12, wherein when a verify operation for each of the plurality of program states has passed, whether to perform the erase state verify operation is determined.

18. The method according to claim 12, wherein the erase state verify operation is an operation of identifying the threshold voltages of the erase cells using an erase state verify voltage.

* * * * *